A. L. FREEDLANDER AND W. G. GOODWIN.
RUBBER TIRE.
APPLICATION FILED MAR. 5, 1921.
1,417,051. Patented May 23, 1922.
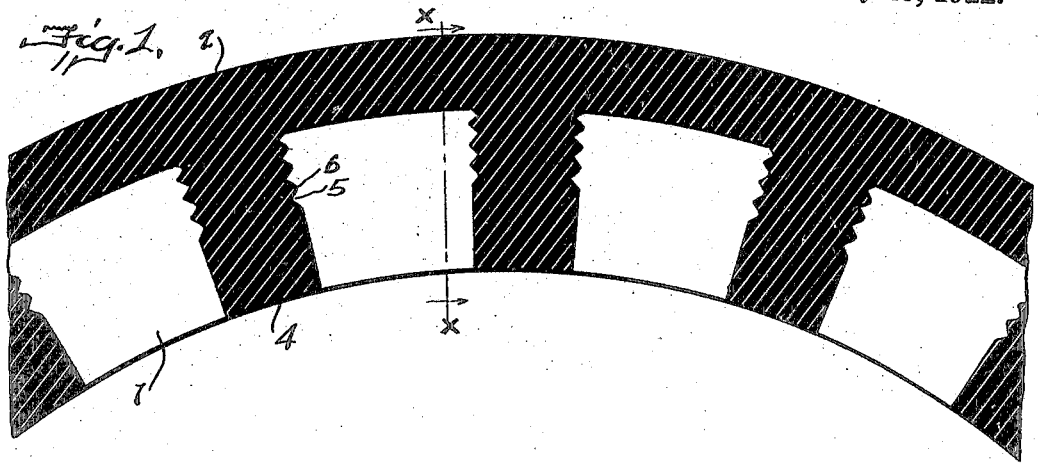
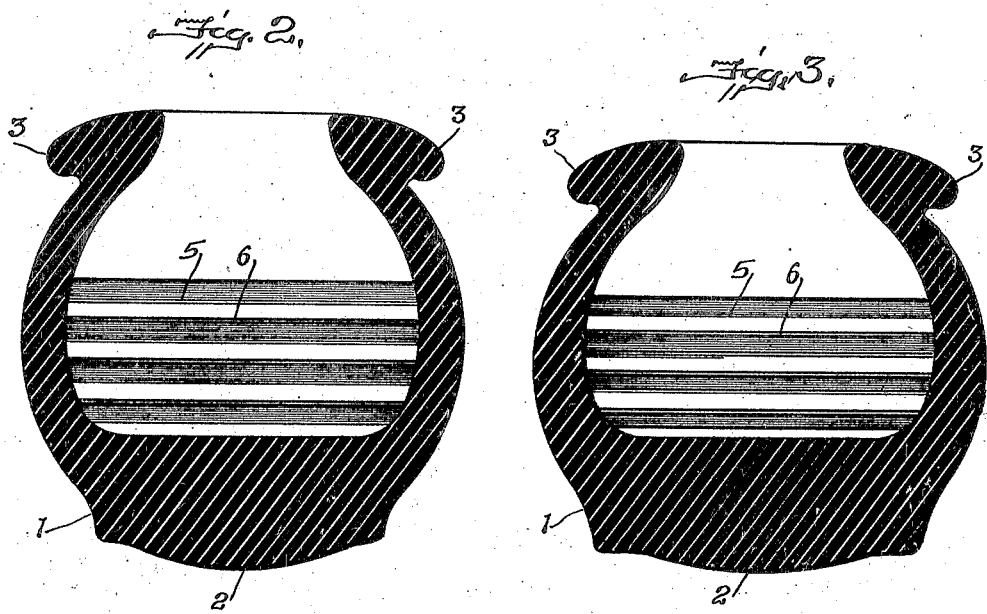
INVENTORS
ABRAHAM L. FREEDLANDER,
WILLIAM G. GOODWIN,
By Toulmin & Toulmin,
ATTORNEYS

UNITED STATES PATENT OFFICE.

ABRAHAM L. FREEDLANDER AND WILLIAM GEORGE GOODWIN, OF DAYTON, OHIO, ASSIGNORS TO THE DAYTON RUBBER MANUFACTURING COMPANY, OF DAYTON, OHIO, A CORPORATION OF OHIO.

RUBBER TIRE.

1,417,051.  Specification of Letters Patent.  Patented May 23, 1922.

Application filed March 5, 1921. Serial No. 449,778.

*To all whom it may concern:*

Be it known that we, ABRAHAM L. FREEDLANDER and WILLIAM G. GOODWIN, citizens of the United States, residing at Dayton, in the county of Montgomery and State of Ohio, have invented certain new and useful Improvements in Rubber Tires, of which the following is a specification, reference being had therein to the accompanying drawing.

This invention relates to improvements in rubber tires for vehicles, such as automobiles.

The object of the invention is to accomplish two results, one of them in particular, in the order here stated, namely, to increase the resiliency and therefore to improve the riding qualities of the tire without materially lessening its load-carrying capacity, so that, for instance, a tire of this kind will yield readily under a compression force equal to 600 pounds while yet perfectly capable of normally maintaining a load of 800 pounds; and to reduce the quantity of certain portions of materials used in building the tire, while yet retaining these results, so as to lessen the cost by the amount of material thus saved.

These ends are accomplished and carried into practical effect by omitting from what is known as the "piers" of the tire, (the stout walls on the interior of the tread which act like spokes to sustain the tread,) certain portions of the material of which the piers are composed. The shape and general body of the piers and their frequency or number in a given tire, enable them to sustain the load with a degree of resiliency consonant with their bulk and composition, yet by the omission of certain portions of the piers we have found that the pier as a whole will yield agreeably and comfortably under pressures materially less than their maximum load carrying capacity.

In the accompanying drawings:

Fig. 1 is a vertical sectional view through a portion of a tire with our improvements incorporated therein;

Fig. 2 is a transverse sectional view say on the line x—x of Fig. 1, and looking in the direction of the arrow so as to show one side of one of the piers; the view illustrating the tire without load;

Fig. 3 is a similar sectional view showing the tire under load and yielding under a pressure much less than its load carrying capacity.

Referring to the drawings generally the numeral 1 designates the outer wall or casing of our tire having the usual or any approved tread surface 2 and beads 3 for interlocking with the tire-retaining devices of the channel iron. At intervals we form within this casing piers 4, the number of piers to a given tire and the distance of the space between each two being controlled by the size or diameter of the tire. The size or bulk of these piers bears also a certain ratio to the load-carrying capacity of the tire, all of these elements being known and understood by those skilled in this art.

When the tires are mounted on automobile wheels and are subjected to load-carrying effects they, including these piers 4, of course, generally compress, shortening radially and widening laterally. These piers, as they extend to the inner periphery of the tires, afford the material support for the incumbent weight. This change of proportions and configuration takes place, of course, only through a short section of that portion of the tires which for the moment is in contact with the ground. As the tires are proportioned and constructed to withstand or carry certain so called normal loads they will undergo these changes of dimensions but slightly, if at all, when the load is applied and no jars are being suffered.

But when obstructions in the road surface are encountered which tend to make the tires yield and compress in response to sudden strains and forces our invention comes into play. With it the tires are more sensitive and yield under less force, so that their yieldability commences and takes place under conditions where without our invention they would not yield at all.

This result is due to the peculiarity of omitting portions of the material which compose the piers, yet without lessening the general dimensions of the piers and without departing from their outlines, which, as shown in Figs. 2 and 3, afford certain arch effects by which the piers give strength and staunchness to the tires to enable them to hold up their loads.

We have found that the most efficient and satisfactory method of omission of material from the piers is that shown in Figs. 1, 2 and 3 in which each pier is constructed with a series of alternating grooves 5 and ribs 6. The ribs preserve the general dimensions in one direction of the piers while the grooves cause an omission of rubber which, though slight in each place, is mateial as to each pier and comprehensive as to, say, three piers inclusive, which number, and more particularly the middle one, would be involved in an act of quick yieldability of the tire when subjected to a "road bump".

By this construction we have ascertained under practical applications that our tire yields quickly, softly and comfortably under conditions which without this improvement have required several hundred pounds greater force to cause them to yield.

When our tire so yields by reason of this invention the grooves 5 become reduced in width and the ribs 6 move closer together, as noticed by a comparison of Fig. 3 with Fig. 2, the former figure illustrating the tire under a given or sudden excessive strain or force over normal. And the tire under this construction instantly responds and returns to normal position and shape as soon as the occasion is passed.

Thus without lessening the load carrying capacity of a given tire in any appreciable or practical degree we have added to its resiliency and responsiveness to road conditions most materially and effectively.

Having thus fully described our invention, what we claim as new and desire to secure by Letters Patent, is:—

1. A tire constructed of a casing having a tread portion and interior piers extending to the inner periphery thereof, placed in succession one after another and duly spaced apart, portions of the body of the piers being omitted at places not affecting the union of the piers and the tread portion.

2. In a tire constructed of a casing and interior piers extending to the inner periphery thereof, and placed in succession one after another, portions of the transverse faces of the piers being omitted.

3. In a tire constructed of a casing and piers extending to the inner periphery thereof and placed in succession one after another, portions of the transverse surfaces of the piers alternating in grooves and ribs.

4. In a tire constructed of a casing having a tread portion and a succession of piers extending to the inner periphery thereof and placed within and united to said tread portion, both transverse surfaces of each pier fashioned into alternate grooves and ribs.

In testimony whereof, we affix our signatures.

ABRAHAM L. FREEDLANDER.
WILLIAM GEORGE GOODWIN.